US011727955B2

(12) United States Patent
Jhatakia et al.

(10) Patent No.: US 11,727,955 B2
(45) Date of Patent: Aug. 15, 2023

(54) DATA TAPE MEDIA ACTION RECOMMENDATION BASED ON MEDIA DRIVE CALIBRATION

(71) Applicant: Oracle International Corporation, Redwood Shores, CA (US)

(72) Inventors: Jitesh Bakul Jhatakia, Superior, CO (US); Cathleen Susan Wharton, Louisville, CO (US); John Mitchell Black, III, Loveland, CO (US); George Edward Noble, Boulder, CO (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/841,321

(22) Filed: Jun. 15, 2022

(65) Prior Publication Data

US 2023/0005499 A1    Jan. 5, 2023

Related U.S. Application Data

(60) Provisional application No. 63/217,040, filed on Jun. 30, 2021, provisional application No. 63/217,032, filed on Jun. 30, 2021, provisional application No. 63/217,036, filed on Jun. 30, 2021.

(51) Int. Cl.
*G11B 5/008* (2006.01)
(52) U.S. Cl.
CPC .............................. *G11B 5/00813* (2013.01)
(58) Field of Classification Search
None
See application file for complete search history.

(56) References Cited

U.S. PATENT DOCUMENTS

| 6,005,731 | A  | * | 12/1999 | Foland, Jr. | ............. G11B 20/18 |
| 7,864,482 | B1 | * | 1/2011  | Babinski   | .............. G11B 5/5534 |
|           |    |   |         |            | 360/77.02 |
| 7,933,090 | B1 | * | 4/2011  | Jung       | ................ G11B 20/10027 |
|           |    |   |         |            | 360/68 |
| 8,406,096 | B1 |   | 3/2013  | Edling et al. | |

(Continued)

FOREIGN PATENT DOCUMENTS

JP    2009-070482 A    4/2009

OTHER PUBLICATIONS

Mayrhauser et al., "Using a neural network to predict test case effectiveness", IEEE Aerospace Applications Conference. Proceedings, Feb. 1995, pp. 77-91.

*Primary Examiner* — Peter Vincent Agustin
(74) *Attorney, Agent, or Firm* — Invoke

(57) ABSTRACT

Techniques for generating action recommendations for a data tape system based on a media drive calibration are disclosed. A system receives a request to perform an operation including an exchange between a data tape and a media drive. If the system determines that the operation is a data tape validation operation, the system determines whether the media drive is calibrated. If the calibration value of the media drive does not meet a threshold, the system performs a calibration procedure. The system may calibrate the media drive or replace the media drive with a calibrated media drive. The system performs the validation operation. Based on a validation result, a data tape quality value, and the media drive calibration value, the system generates a recommended action for a data tape.

20 Claims, 6 Drawing Sheets

(56) References Cited

U.S. PATENT DOCUMENTS

| | | | |
|---|---|---|---|
| 8,730,778 | B2 | 5/2014 | Wharton et al. |
| 8,842,384 | B2 | 9/2014 | Jhatakia et al. |
| 8,849,782 | B2 | 9/2014 | Black, III et al. |
| 8,849,783 | B2 | 9/2014 | Abramovitz et al. |
| 8,849,784 | B2 | 9/2014 | Alber et al. |
| 8,922,929 | B1* | 12/2014 | Ruan .................. G11B 5/6088 360/75 |
| 8,976,633 | B1* | 3/2015 | Ruan .................. G11B 5/6076 369/13.11 |
| 9,020,921 | B2 | 4/2015 | Alber et al. |
| 9,099,162 | B2 | 8/2015 | Alber et al. |
| 2002/0154438 | A1* | 10/2002 | Hirano .................. G11B 5/54 |
| 2005/0044451 | A1 | 2/2005 | Fry et al. |
| 2007/0050569 | A1 | 3/2007 | Haustein et al. |
| 2013/0339827 | A1* | 12/2013 | Han .................. H04L 25/067 714/799 |
| 2019/0221234 | A1 | 7/2019 | Peng et al. |
| 2023/0005499 | A1* | 1/2023 | Jhatakia .............. G06F 11/3034 |
| 2023/0005501 | A1* | 1/2023 | Wyman .................. G06F 11/10 |
| 2023/0005511 | A1* | 1/2023 | Jhatakia ................ G06F 3/0686 |

* cited by examiner

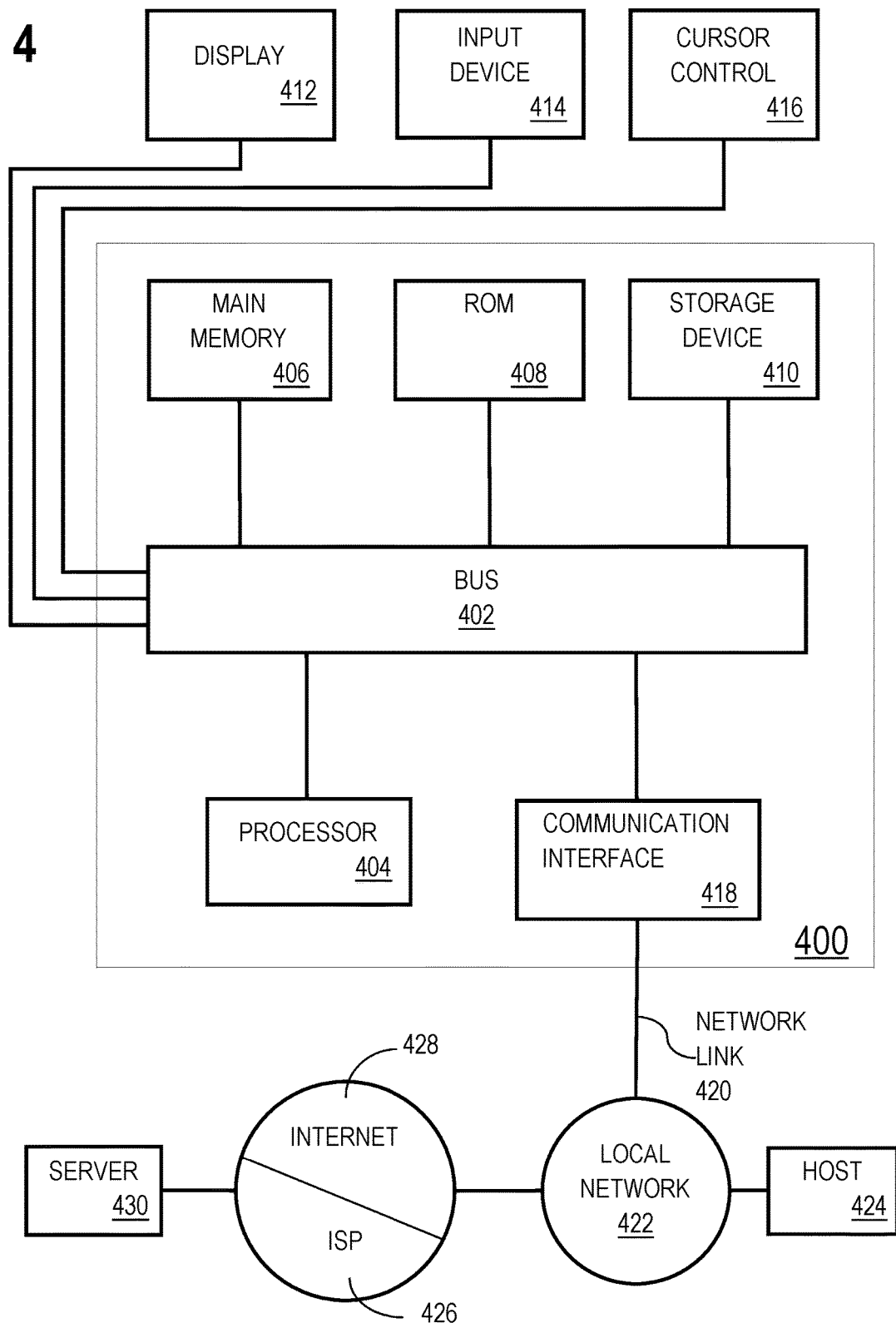

DATA TAPE MEDIA ACTION RECOMMENDATION BASED ON MEDIA DRIVE CALIBRATION

BENEFIT CLAIMS; RELATED APPLICATIONS; INCORPORATION BY REFERENCE

This application claims the benefit of U.S. Provisional Patent Applications: 63/217,032, filed Jun. 30, 2021; 63/217,036, filed Jun. 30, 2021; and 63/217,040, filed Jun. 30, 2021, each of which are hereby incorporated by reference in their entirety.

The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to data tape action recommendation based on a media drive calibration. In particular, the present disclosure relates to generating action recommendations for a data tape cartridge or media drive based on a particular data tape quality value and a media drive calibration value.

BACKGROUND

Magnetic tape storage provides cost and storage density advantages over many other data storage technologies. Data centers often utilize both tape storage and disk storage to complement each other. Tape storage is often used for backup and archival data storage. Disk storage is often used for more frequently accessed data storage.

Magnetic tape data storage ("data tape") uses digital recording on magnetic tape to store digital information. Tapes are packed in cartridges or cassettes. A tape drive performs read/write operations from/to the tape. A robotically-accessed tape library houses data tape cartridges to provide large quantities of data storage.

Over time, data tape quality may degrade. Degradation may be a result of physical wear in the data tape or data tape cartridge. Alternatively, the degradation may be a result of media errors, or errors in the data stored on the data tape. Data tape libraries employ monitoring systems to detect errors in read/write operations.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 4 shows a block diagram that illustrates a computer system in accordance with one or more embodiments.

DETAILED DESCRIPTION

Figure 1:
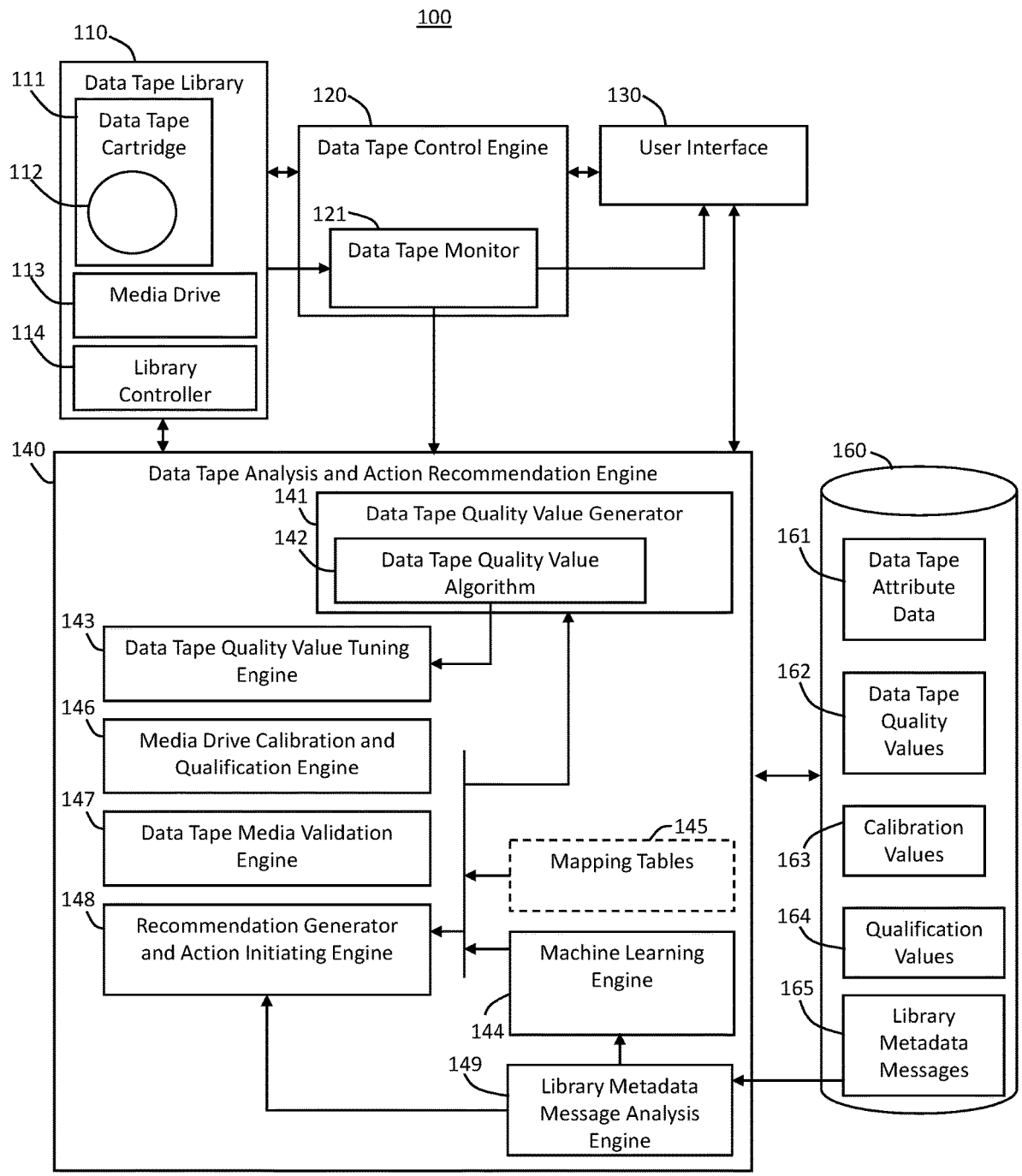
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. DATA TAPE MEDIA ACTION RECOMMENDATION BASED ON MEDIA DRIVE CALIBRATION
4. EXAMPLE EMBODIMENT
5. COMPUTER NETWORKS AND CLOUD NETWORKS
6. MISCELLANEOUS; EXTENSIONS
7. HARDWARE OVERVIEW

1. General Overview

A storage tape analytics (STA) application monitors the operating status of media devices in a data tape library. Media devices include data tapes, data tape cartridges, and media drives. The STA application may also provide a user interface to allow a user to interact with a display of the media devices in the data tape library. The user interface may provide operational data, such as an operational status of a media device. The STA application may allow a user to perform media validation operations, including validating data tapes and calibrating and qualifying media drives. When a media validation operation is performed with a calibrated media drive, a system may associate any alerts resulting from the media validation operation with the data tape with a high level of confidence. For example, a read error may be associated with a default recommendation to clean the media drive used in a media validation operation. However, if the media drive is calibrated, the system may, with a high level of confidence, generate an alternative recommendation to check the data tape instead of cleaning the media drive.

Calibrating a media drive includes performing a statistical analysis of the drive when a data tape cartridge of a known quality is inserted in the drive. Calibrating the media drive may result in a successful calibration or a calibration failure. A successful calibration occurs when a number or type of errors identified during the calibration operation is less than a predefined threshold. A failed calibration may result when the number or type of errors is greater than the threshold, or when insufficient data is available to complete the calibration.

Successfully calibrating a media drive allows the STA application to perform a media validation of a tape drive using the calibrated media drive. Since the media drive has been calibrated, the STA application can identify the operational status of a tape drive with a high degree of confidence. For example, if a media validation operation on a tape drive inserted into the calibrated media drive indicates the data tape is degraded, the STA can indicate with a high degree of confidence that the detected degradation may be attributed to the data tape and not the calibrated media drive. Similarly, the STA application may generate recommended actions for a tape drive with a high level of confidence.

One or more embodiments include a data tape system that generates action recommendations for a data tape based on a particular measured data quality value of the data tape. The particular data quality value may be measured using the calibrated media drive. The system may generate recommended actions based on the data quality value. The system may generate a confidence level for the recommended actions based on the calibration result of the calibrated media drive. The data tape quality value may be based on: (a) a particular data tape error correction value representing detected errors associated with the data tape, (b) a particular value representing an amount of data processed (read/write operations performed on the data tape), and (c) a scaling factor. In one or more embodiments, the data tape quality value is a data tape read quality value indicating a readability of the data tape. The scaling factor represents a relationship between the data tape error correction value, the value representing the amount of data processed in read/write operations of the data tape, and a degradation level of the data tape.

One or more embodiments include receiving a request to perform an action using a media drive. The action may be, for example, a media validation operation to validate an operating status of a data tape. The system determines whether the media drive is calibrated. If the media drive is not calibrated, the system performs a calibration operation to ensure the request is carried out on a calibrated media drive. For example, the system may perform a calibration operation of the media drive. If the calibration is successful (i.e., a calibration score exceeds a threshold), the system executes the requested operation on the media drive. If the calibration is unsuccessful, the system may execute the requested operation on another media drive that is calibrated. Alternatively, the system may generate a selectable notification on a user interface that permits selection of the media drive or an alternative media drive for carrying out the requested operation.

One or more embodiments include determining whether a media drive is calibrated by determining: (a) that the media drive has been calibrated, and (b) determining an amount of data that has been read from or written to data tapes using the media drive since the last calibration. Alternatively, the determination may be based on determining (b) an amount of time that has passed since the last calibration. Upon determining that a media drive has been calibrated and an amount of data processed, or an amount of time elapsed, exceeds a threshold, the system may perform a qualification operation on the media drive to re-calibrate the media drive.

One or more embodiments include receiving a metadata message from a data tape library. The metadata message includes status indication of a data tape or media drive and a recommended action. The system determines a confidence level for the recommended action based on a calibration status of the media drive. For example, if the metadata message indicates the media drive cause the error, and if the system determines the media drive was successfully calibrated, the system may alter the recommendation or associate the recommendation with a low confidence score. For example, the system may identify a similar type of error associated with an error in data tapes. The system may alter the generated recommendation to recommend taking action on the data tape instead of the media drive. The system may transmit the altered recommendation to a user interface.

One or more embodiments include a graphical user interface (GUI) that displays data tape library data. The GUI allows a user to view and select data tapes, media drives, and operations to be performed using the data tapes and media drives. The GUI includes one or more fields specifying media validation values, data tape quality values, and calibration values for data tapes and media drives. The GUI may include one or more selectable user interface elements to initiate a calibration operation of a media drive, a media validation operation of a data tape, and a data tape quality calculation of the data tape.

One or more embodiments described in this Specification and/or recited in the claims may not be included in this General Overview section.

2. System Architecture

FIG. 1 illustrates a system 100 in accordance with one or more embodiments. As illustrated in FIG. 1, system 100 includes a data tape library 110, a data tape control engine 120, a user interface 130, a data tape analysis and action recommendation engine 140, and a data repository 160.

The data tape control engine 120 provides commands to the library controller 114 to perform a read or write operation on the data tape 112 of the data tape cartridge 111. The library controller 114 controls a robot arm of the data tape library 110 to access the data tape cartridge 111 and insert the data tape cartridge 111 into a media drive 113 to perform the read or write operation. Once the data tape cartridge 111 is loaded into the media drive 113, the data tape control engine 120 communicates with the media drive 113 to perform the read and/or write operations. During a read operation, the media drive 113 transmits read data from the data tape 112 to the data tape control engine 120. During a write operation, the data tape control engine 120 transmits write data to the media drive 113 to write to the data tape 112. Upon completion of the read and/or write operations, the library controller 114 de-mounts the data tape cartridge 111 from the media drive 113. The library controller 114 detects, upon completion of the read and/or write operations, performance information, such as whether read and/or write operations were successful, error data, and other performance notifications. A data tape monitor 121 receives from the library controller 114 the performance information associated with the read and/or write operation. If the operation results in a hard error, such as an inability of the media drive 113 to write to, or read from, the data tape 112, the data tape monitor 121 receives an alert from the library controller 114. The alert may include a recommended action. Examples of alerts include hard error alerts, advisory alerts, and informational alerts. A hard error alert may be any error that prevents read/write operations, such as a total loss of the data tape, mechanical malfunction, media corruption, or extreme wear of the data tape.

The library controller 114 transmits hard error alert data, advisory alert data, and informational alert data associated with read and/or write operations as metadata to the data tape control engine 120. A hard error alert may be any error that prevents read and/or write operations, such as a total loss of the data tape, mechanical malfunction, media corruption, or extreme wear of the data tape.

In one embodiment, the library controller 114 includes an application or program that analyzes the performance of the media drive 113 associated with a read and/or write operation and generates hard error alerts, advisory alerts, and informational alerts. The hard error alert may include a recommendation that the data tape should not be used to store data. The hard error alert may also include a notice that the data tape is unusable, and a read/write operation could not be carried out. An advisory alert may indicate that an error occurred during a read/write operation, but that the operation was able to be performed successfully. The advisory alert may also provide a notice that information included in the data tape should be moved to another data tape in the near future. An informational-type alert occurs when a read/write operation occurs without any errors. For example, the library controller 114 may be configured to generate an informational alert when it determines a particular distance of data tape has been read. For example, if an amount of data written to/read from a data tape corresponds to a full wrap (traversing the tape from one end to the other), the library controller 114 may generate an informational-type alert. Informational alerts may also indicate a type of data tape cartridge 111 being read from/written to, that a particular tape has been in use for a particular amount of time, or any other information that does not necessarily include a tape failure or data read/write error.

In addition to generating commands to read from/write to a data tape 112 in the data tape library 110, the data tape control engine 120 may also control operating modes and monitoring commands of the data tape library 110. For example, in a data tape analysis operating mode, the data tape control engine 120 may issue calibration commands, qualification commands, data tape quality measurement commands, or media quality commands. For example, an operator may access a graphical user interface (GUI) displayed by the user interface 130 to request a media validation of a particular data tape 112 in the data tape library 110. In the data tape analysis operating mode, the library controller 114 may return data about the state of the data tape 112 included in the media validation request without receiving any write data from the data tape control engine 120 and without transmitting any read data to the data tape control engine 120.

The data tape analysis and action recommendation engine 140 analyzes data generated by the library controller 114 and the data tape monitor 121 of the data tape control engine 120. The data tape analysis and action recommendation engine 140 includes a data tape quality value generator 141, a data tape quality value tuning engine 143, a media drive calibration and qualification engine 146, and a data tape media validation engine 147.

The data tape quality value generator 141 generates a data tape quality value based on a data tape quality value algorithm 142. The data tape quality value algorithm 142 includes values representing (a) a particular data tape error correction value, (b) a particular value representing an amount of data processed (read/write), and (c) a scaling factor. In one embodiment, the data tape quality value is a data tape read quality value indicating a readability of the data tape. The data tape read quality value may include data associated with read operations while excluding data associated with write operations. In one embodiment, the particular data tape error correction value is a filtered "total corrected read errors" value. The "total corrected read errors" value represents a type of read error requiring physical rewinding of the data tape to re-read a portion of the data tape that was previously read, but which resulted in an error. Filtering the total corrected read errors value includes omitting from the value the re-reads that are not necessarily the result of read errors. For example, if a tape drive is known to re-read portions of the data tape when first beginning a read operation, the re-read operations at the beginning of the read operation may be omitted from the filtered "total corrected read errors" value. Otherwise, the total corrected read errors value may be artificially inflated.

The system may track an amount to data read from the data tape in read operations and/or written to the data tape in write operations to obtain the value representing an amount of data processed. Alternatively, the system may derive the value representing the amount of data processed by tracking a length of tape read from or written to, and deriving, based on a known amount of data per distance, the amount of data read from/written to the data tape.

The scaling factor is a numerical value which represents a relationship between the data tape error correction value, the value representing the amount of data processed in read/write operations of the data tape, and a degradation level of the data tape. The data tape analysis and action recommendation engine 140 includes a data tape quality value tuning engine 143. The data tape quality value tuning engine 143 adjusts the scaling factor for a particular data tape or set of data tapes based on data tape attribute data 161. Example data tape attribute data 161 includes: a type of data tape, a brand of data tape, a material making up the data tape, dimensions of the data tape (such as thickness, width, length), media characteristics (such as compression levels, amount of data stored, number of over-writes on the data tape), and environmental attributes (such as humidity, temperature, light levels, and magnetic field strengths of an environment in which the data tape is stored). For example, for a particular brand of data tape, storage at a higher temperature and humidity may cause the data tape to degrade more rapidly when the data tape is frequently accessed for data re-reads and re-writes. In an embodiment in which a machine learning model generates a scaling factor, the data tape quality value tuning engine 143 provides feedback to the machine learning model engine during training of the model. Based on the feedback, the machine learning model engine updates a training data set and re-trains the model.

In one embodiment, the data tape quality value algorithm 142 may be represented as:

$DTQ = 90 - \alpha*(2*TCREF/WR)^\beta$, where DTQ is the data tape quality value, $\alpha$ is a degradation co-efficient, TCREF is a filtered total corrected read error value, WR is a "wraps read" value, corresponding to the value representing the amount of read data tape, and $\beta$ is the scaling factor.

In the above equation, the value "90" defines a range of values for the data tape quality value. However, embodiments encompass any range of values. The range of potential values for a data tape quality may be set by a user, for example. The degradation coefficient is a value less than 90 that defines how much the "errors per distance" calculations (raised to the scaling factor) will increase/reduce the data tape quality value. For example, if the degradation coefficient is set to "20," then the final data tape quality value will be calculated as the "errors per distance" times 20. The degradation coefficient may be set by a user, for example, to cause the data tape quality values to fall along a desired range of values.

In one embodiment, the data tape analysis and action recommendation engine 140 includes a machine learning engine 144 for training a machine learning model to generate, for a particular set of data tape attributes, a scaling factor value. For example, the machine learning engine 144 may generate a training data set from the data tape attribute data 161 to identify sets of data tape attributes and corresponding scaling factor values. The machine learning model may be trained to identify relationships among different data tape attributes and scaling factor values. In an alternative embodiment, the data tape analysis and action recommendation engine 140 maps a particular data tape attribute or set of attributes to a particular scaling factor using a mapping table 145. The mapping table 145 may include, for example, fields representing ranges of values for data tape attributes and scaling factor values associated with the ranges of values.

The media drive calibration and qualification engine 146 performs a media drive calibration on a designated media drive 113 in the data tape library 110. For example, a data tape library 110 may include multiple media drives 113. One or more of the media drives may be designated as "validation" drives. These drives may be calibrated, using a data tape cartridge 111 having known attributes, to ensure the media drive 113 designated as a validation drive meets a threshold operation status. In addition, the validation drive may be inaccessible to host applications that read from and write to data tapes 112 in the data tape library 110. Instead, the validation drive may be accessible only by the library controller 114 for carrying out calibration, qualification (ensuring continued calibration of the media drive), and validation operations. Consequently, when a media validation is requested for a particular data tape 112, the library controller 114 selects, from among the multiple media drives 113, the media drive that is calibrated and designated as the validation drive. Since the validation drive has been calibrated, the result of the media validation operation is more likely to accurately reflect a state of the media, and not necessarily a state of the validation drive. In one or more embodiments, the library controller 114 uses a calibrated media drive 113 to perform a statistical analysis to generate the data tape quality value.

The data tape media validation engine 147 determines an operating state of a particular data tape 112 in the data tape library 110. The validation operation may be initiated by a user, by a pre-defined schedule, or by any triggering event detected by the library controller 114 or the data tape monitor 121. For example, a data tape control engine 120 may store a set of rules for determining when a validation is performed. The set of rules may include one rule to perform a validation of the data tape 112 after a predetermined number of uses of a data tape 112, another rule to perform a validation of the data tape 112 after a predetermined period of time has elapsed, and another rule to perform a validation of the data tape 112 after a predetermined number of read/write errors is detected when reading from or writing to the data tape 112.

In one embodiment, the data tape analysis and action recommendation engine 140 includes a recommendation generator and action initiating engine 148. The recommendation generator and action initiating engine 148 makes action recommendations and initiates system actions for a data tape based on (1) data tape attribute data 161, (2) data tape quality values 162, and (3) library metadata messages 165. When calibration and/or qualification operations have been performed, the action recommendations and system actions may further be generated/initiated based on media drive calibration values 163 and media drive qualification values 164.

In one embodiment, the recommendation generator and action initiating engine 148 generates a recommendation or initiates an action based on a trained machine learning model. The machine learning engine 144 may train a machine learning model to generate, for a particular data tape, an action recommendation. For example, the machine learning engine 144 may generate a training data set from the data tape attribute data 161, data tape quality values 162, and library metadata messages 165 to identify action recommendations associated with particular sets of data tape attribute data 161, data tape quality values 162, and library metadata messages 165. The machine learning model may be trained to identify relationships among different data tape attribute data 161, data tape quality values 162, and metadata messages 165 and action recommendations. In addition, the machine learning engine 144 may train the machine learning model based on data indicating whether a prescribed action resulted in a successful correction of an error or not. For example, the training data set may include the data tape attribute data 161, data tape quality values 162, and metadata messages 165, as well as an indication of the historical action recommended for the set of data tape attributes and an indication of whether the historical recommended action resulted in successful resolution of a detected error.

In an alternative embodiment, the data tape analysis and action recommendation engine 140 maps a particular set of data tape attribute data 161, data tape quality values 162, and metadata messages 165 to a particular action recommendation using a mapping table 145. The mapping table 145 may include, for example, fields representing ranges of values for data tape attributes and scaling factor values associated with the ranges of values.

In one embodiment, the data tape analysis and action recommendation engine 140 includes a library metadata message analysis engine 149. The library metadata message analysis engine 149 may analyze a library metadata message 165 and determine whether to bypass a machine learning engine 144. For example, if the data tape control engine 120 controls the data tape media validation engine 147 to initiate a media validation of a particular data tape 112, the library controller 114 may generate a hard error metadata message. The hard error metadata message may indicate that the selected data tape is no longer usable by host applications for read or write operations. Based on the particular type of library metadata message, the library metadata message analysis engine 149 may transmit the library metadata message directly to the recommendation generator and action initiating engine 148 without applying a machine learning algorithm to an input data set including the library metadata message.

In one embodiment, the recommendation generator and action initiating engine 148 stores one or more tables indicating prescribed recommendations and actions for particular sets of data tape attributes data 161, data tape quality values 162, and library metadata messages 165. The one or more tables may be generated by a machine learning model trained by the machine learning engine 144 to function as an expert system. The machine learning engine 144 may train a machine learning model to analyze historical data including the data tape attribute data 161, data tape quality values 162, and library metadata messages 165 associated with previously-encountered or analyzed data tapes. The historical data may also be obtained from additional sources, such as online libraries including historical data tape information. The machine learning engine 144 trains the machine learning model based on the historical data to generate, for different combinations of input data, corresponding action recommendations. The recommendation generator and action initiating engine 148 stores the action recommendations in the one or more tables. Upon encountering a particular set of data tape attribute data 161, data tape quality values 162, and library metadata messages 165 resulting from a data tape media validation operation, the recommendation generator and action initiating engine 148 consults the one or more tables to generate a recommendation or to initiate an action.

In one embodiment, one or more of the library metadata messages 165 may include a default recommendation. For example, the library controller 114 may generate a library metadata message indicating that a particular read error occurred and recommending cleaning of a media drive. However, the recommendation generator and action initiating engine 148 may generate a different recommendation by taking into account not only the library metadata message, but also a data tape quality value, a data tape media validation value, and a calibration value of a media drive. A machine learning model may determine that, for the particular set of input data cleaning the media drive would not necessarily resolve the error. Instead, the machine learning model may recommend cleaning a data tape.

Examples of recommendations generated by the recommendation generator and action initiating engine 148 include: (1) use a different media drive for the requested operation, (2) migrate data from the data tape to another data tape, (3) an end-of-life metric has been detected: migrate data to another data tape, (4) data tape quality is less than quality required for the stored media—replace the data tape with one of a higher quality grade, (5) wrong type of data tape detected for requested operation—change data tape, (6) data drive is incompatible with data tape—change to another data drive and repeat operation, (7) data tape read failure—migrate data to another data tape and do not use data tape, (8) recommendation not possible—type of error unknown, (9) clean media drive, (10) clean data tape, (11) re-run requested operation, (12) data encryption error encountered—re-run requested operation.

In one or more embodiments, interface 130 refers to hardware and/or software configured to facilitate communications between a user and the data tape control engine 120 and data tape analysis and action recommendation engine 140. Interface 130 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 130 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 130 is specified in one or more other languages, such as Java, C, or C++.

In one or more embodiments, a data repository 160 is any type of storage unit and/or device (e.g., a file system, database, collection of tables, or any other storage mechanism) for storing data. Further, a data repository 160 may include multiple different storage units and/or devices. The multiple different storage units and/or devices may or may not be of the same type or located at the same physical site. Further, a data repository 160 may be implemented or may execute on the same computing system as the data tape control engine 120, the data tape library 110, or the data tape analysis and action recommendation engine 140. Alternatively, or additionally, a data repository 160 may be implemented or executed on a computing system separate from the data tape control engine 120, the data tape library 110, or the data tape analysis and action recommendation engine 140. A data repository 104 may be communicatively coupled to the data tape control engine 120, the data tape library 110, or the data tape analysis and action recommendation engine 140 via a direct connection or via a network.

Information describing the data tape attribute data 161, data tape quality values 162, calibration values 163, qualification values 164, and library metadata messages 165 may be implemented across any of components within the system 100. However, this information is illustrated within the data repository 160 for purposes of clarity and explanation.

In one or more embodiments, the data tape control engine 120, the data tape library 110, or the data tape analysis and action recommendation engine 140 refers to hardware and/or software configured to perform operations described herein for managing a data tape library 110 and analyzing data tapes. Examples of operations for analyzing data tapes of a data tape library are described below with reference to FIG. 2.

In an embodiment, the data tape control engine 120, the data tape library 110, or the data tape analysis and action recommendation engine 140 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 5, titled "Computer Networks and Cloud Networks."

3. Data Tape Media Action Recommendation Based on Media Drive Calibration

Figure 2:
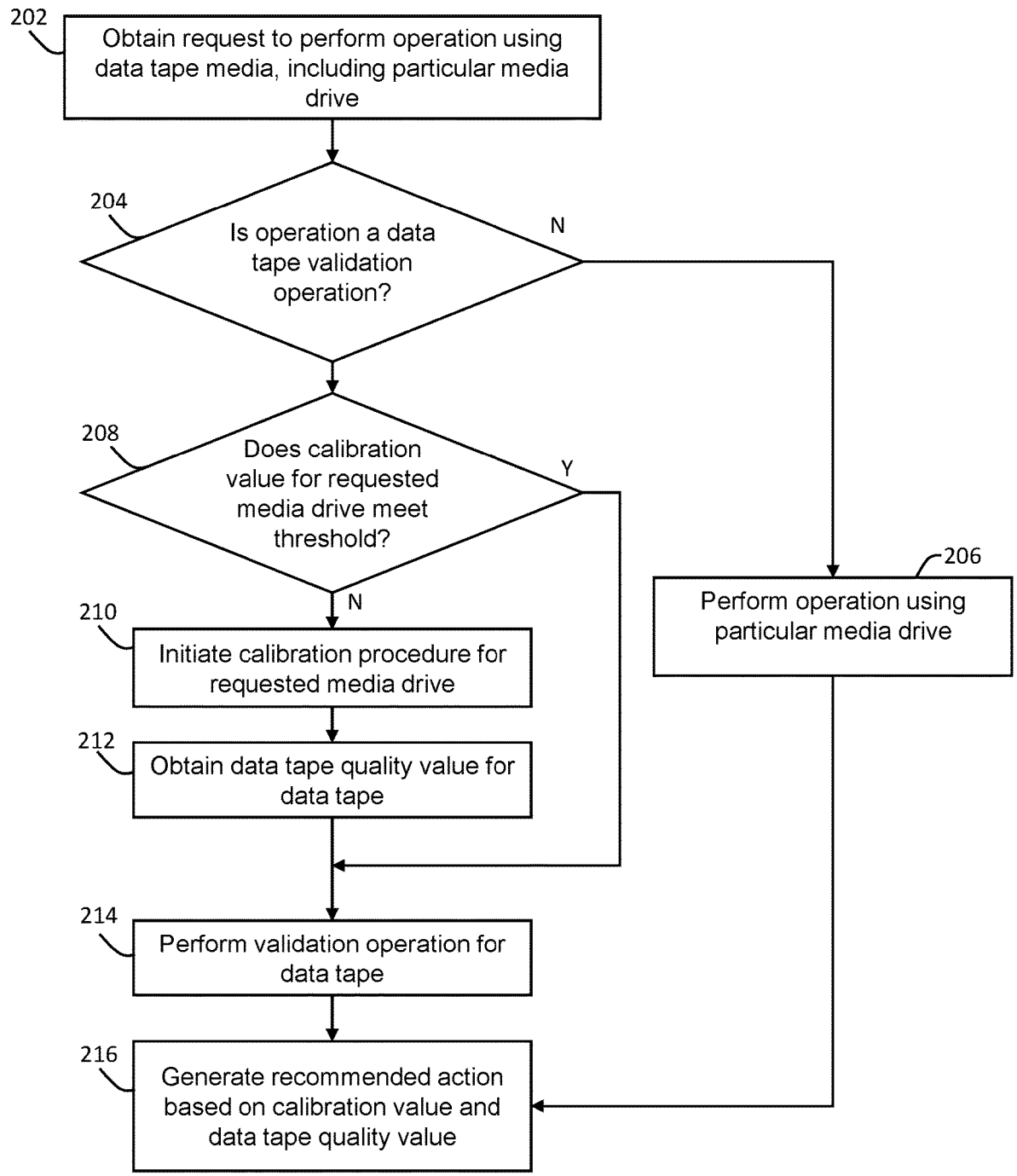
FIG. 2 illustrates an example set of operations for generating a recommendation in data tape system based on a calibration status of a media drive in accordance with one or more embodiments.

FIG. 2 illustrates an example set of operations for generating action recommendations for data tape media based on media drive calibration in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

A system receives a request to perform an operation (Operation 202). For example, a user may select a user interface element on a GUI to select a particular data tape, a particular media drive, and a particular operation to be performed. According to one example embodiment, a user selects only a data tape for an operation, without selecting any particular media drive to perform the operation. For example, the user may request to write data X to memory location Y. The system may refer to an address table to identify the data tape associated with memory location Y. The system may designate, without any intervening user selection of any media drive, a particular media drive to perform the operation. According to another example, a data tape library may include one or more pools of media drives for performing read/write operations from/to data tapes. The system may select a media drive at random, based on an operational status of the media drive, based on a type of the data tape, or based on any other criteria.

The system determines if the requested operation is a validation operation (Operation 204). A validation operation is a particular type of operation that causes a data tape library controller to perform a statistical analysis on a data tape to identify an operational state of the data tape. For example, the validation operation may result in a state of "usable-good," "usable-degraded," "warning: migrate data," and "unusable." According to an embodiment, a validation operation may be selected by an operator or system independently of other read, write, and erasure operations. For example, an operator or application may request a data read operation to read data from memory. The operator or application may request a data write operation to write data to memory. The operator or application may request a data erasure operation to erase data from memory. The read, write, and erasure operations may be performed without validating the data tape. In other words, the read, write, and erasure operations process data on a data tape without determining the operational state of the data tape.

If the operation is not a validation operation, the system initiates the operation using the selected data tape and media drive (Operation 206). For example, the system may initiate a read operation from the data drive or a write operation to the data drive using the selected media drive.

If the requested operation is a validation operation, the system determines if a calibration value for the selected media drive meets a threshold value (Operation 208). For example, a calibration value may be within a range from 0-100, with 100 being an error-free calibration operation, 75-100 being good condition, 40-75 being usable but not recommended, and 0-50 being unusable or unreliable. The system may determine whether the calibration score for the selected media drive is 75 or greater.

In addition to determining a calibration value, one or more embodiments include determining whether a media drive is calibrated by determining: (a) that the media drive has been calibrated, and (b) determining an amount of data that has been read from or written to data tapes using the media drive since the last calibration. Alternatively, the determination may be based on (b) determining an amount of time that has passed since the last calibration. Upon determining that a media drive has been calibrated and an amount of data processed, or an amount of time elapsed, exceeds a threshold, the system may perform a qualification operation on the media drive to re-calibrate the media drive.

If the calibration value meets the threshold value, the system may initiate the requested validation operation using the particular media drive (Operation 214). If the calibration value does not meet the threshold value, the system may initiate a media drive calibration or qualification procedure (Operation 210). For example, the system may determine that the media drive has not been calibrated. In response, the system may initiate an operation to calibrate the media drive. As another example, the system may determine that the media drive was calibrated previously, but that a certain amount of data has been written to/read from data tapes using the media drive, or that a certain amount of time has elapsed since the last calibration. Accordingly, the system may initiation a qualification operation of the media drive.

The calibration or qualification operation may include providing the media drive with a calibration data tape having a known good operational status. The system may perform a statistical analysis of read and write operations of the media drive using the calibration data tape to perform the calibration or qualification operation. The system assigns a calibration status to the media drive based on the results of the statistical analysis. As discussed above, a calibration value may be within a range from 0-100, with 100 being an error-free calibration operation ("Gold" status), 75-100 being good condition ("Good" status), 40-75 being usable but not recommended ("Usable" status), and 0-50 being unusable or unreliable ("Unusable" status).

In the case of a qualification operation to update the calibration status of the media drive, the system updates the calibration status of the media drive based on the results of the qualification operation. For example, an initial calibration status of the media drive may have been "Usable." Subsequent to the qualification operation, the system may determine that the status of the media drive is "Good," indicating the statistical analysis returned fewer errors than the initially-performed calibration operation. Alternatively, the system may determine that the status of the media drive is "Unusable," indicating the statistical analysis returned more errors than the initially-performed calibration operation.

According to yet another example, the system may initiate a calibration procedure by selecting a different media drive than the requested media drive for performing the media validation operation. For example, the particular media drive may be one media drive of a particular type among a pool of similar media drives. The system may determine that the requested media drive is uncalibrated or has an "Unusable" calibration status. The system may select another, calibrated, media drive from the pool of media drives for performing the validation operation. The system may select the alternative media drive based on the alternative media drive having a status of "Good" or "Gold." The system may further generate a notification to a user interface to inform an operator of a change in a media drive. In one embodiment, the notification includes a selectable user interface element to allow the operator to select whether to replace the un-calibrated media drive with a calibrated media drive.

The system obtains a data tape quality value associated with a data tape (Operation 212). The system may retrieve a previously-stored data tape quality value. Alternatively, the system may calculate the data tape quality value using the requested calibrated media drive or another media drive. The data tape quality value may be based on: (a) a particular data tape error correction value representing detected errors associated with the data tape, (b) a particular value representing an amount of data processed (read/write operations performed on the data tape), and (c) a scaling factor. The scaling factor represents a relationship between the data tape error correction value, the value representing the amount of data processed in read/write operations of the data tape, and a degradation level of the data tape. According to one embodiment, the system calculates the data tape quality value based on an algorithm that includes a degradation coefficient. The algorithm may raise a product of (a) the particular data tape error correction value and (b) the particular value representing the amount data processed to an exponent value equal to the scaling factor. The degradation coefficient may be applied to the product of the data tape error correction value and the value representing the amount of data processed to indicate a weight applied to the product to generate the data tape quality value.

In one embodiment, the data tape quality value is a data tape read quality value representing a readability of the data tape. The data tape read quality value may be generated without data representing write operations associated with the data tape. According to an alternative embodiment, the data tape quality value may include write data. A data tape quality value including write data may indicate a ratio of an actual density of recorded data to a maximum recordable density of data.

The system may calculate the particular data tape error correction value based on tracking data tape errors associated with the data tape over time. The system may assign different weights to different types of errors. For example, the system may assign a greater weight to detected read errors that delay a read operation beyond a threshold delay time than to read errors that delay the read operation below the threshold delay time. For example, one read error may result in restarting a read operation, while another read error may be corrected using error correction processes without requiring restarting of the read operation. The system may store values representing types of read/write/erasure errors and a frequency of the errors. The system may calculate the particular data tape error correction value based on the stored information associated with the type and frequency of read, write, and/or erasure errors.

In one embodiment, the particular data tape error correction value is a filtered "total corrected read errors" value. The "total corrected read errors" value represents a type of read error requiring physical rewinding of the data tape to re-read a portion of the data tape that was previously read, but which resulted in an error. Filtering the total corrected read errors value includes omitting from the value the re-reads that are not necessarily the result of read errors. For example, if a tape drive is known to re-read portions of the data tape when first beginning a read operation, the re-read operations at the beginning of the read operation may be omitted from the filtered "total corrected read errors" value. Otherwise, the total corrected read errors value may be artificially inflated.

The system calculates the value representing the amount to data processed by tracking the data tape usage over time. According to one embodiment, the value representing the amount of data processed is measured in units of data, such as bytes (e.g., gigabytes, terabytes, etc.) Alternatively, the system may derive the value representing the amount of data processed by tracking a length of tape read from or written to, and deriving, based on a known amount of data per distance, the amount of data read from/written to the data tape. For example, the system may track read and/or write operations spanning 100 meters over time. It is noted that the tracked read/write distance may be more than, or less than, a total length of the data tape. For example, if a data tape has a length of 10 meters, the system may track a series of operations over time, each of which corresponds to a read/write distance (e.g., the distance of the data tape passing over a read/write head of a media drive) less than 10 meters. The sum of the read/write distances associated with the series of operations may add up to 100 meters.

The system generates the scaling factor by applying a trained machine learning model to attributes of a data tape. The model generates a scaling factor for a particular data tape based on the attributes of the particular data tape. The scaling factor may be set by either a preproduction process (default scaling factor) or later as a sensitivity adjustment by a user or service provider. The scaling factor may also be set by an expert system via machine learning. The system may derive the scaling factor from a set of exchanges between data tapes and media drives. In one embodiment, attributes of data tapes used to define a scaling factor for a particular data tape or set of data tapes is collected at the end of an exchange between a data tape and a media drive.

The system performs the media validation operation (Operation 214). The system provides the selected data tape to the selected media drive and performs a statistical analysis of the data tape to generate a media validation value for the data tape. The media validation value may be based, for example, on the data tape quality value and one or more additional metrics measured during the validation operation.

According to one embodiment, the validation operation includes measuring a frequency of a certain type of error encountered during the validation operation. Examples of the types of errors that may be encountered during a validation operation include the filtered "total corrected read errors," errors that do not require rewinding of the data tape to be resolved, errors associated with code or data stored on the data tape, errors associated with a physical condition of a data tape, such as a damaged tape or damaged cartridge, and errors associated with a physical condition of a media drive.

The system generates a recommended action based on the validation operation (Operation 216). In one embodiment, the system refers to a table that maps media validation values to particular actions. For example, the table may indicate that if the media validation value is below a threshold level, the data on the data tape should be migrated to another data tape. The table may indicate that if the media validation value is above a threshold level, the data tape is in good condition. The table may recommend re-scheduling a media validation operation for a future time or after a threshold number of data access operations.

In one embodiment, the recommended action takes into account the calibration status of the media drive. For example, during, or subsequent to performing the validation operation (Operation 214) or the requested operation (Operation 206), a data tape library controller may generate a metadata message including a default recommended action based on a detected error during or after the validation operation (Operation 214) or the requested operation (Operation 206). The system may generate a recommended action that differs from the default recommended action generated by the data tape library. In one embodiment, the system is embodied as a data tape library platform including software and hardware for interfacing with the data tape library. The data tape library platform may correspond, for example, to the data tape analysis and action recommendation engine 140 illustrated in FIG. 1. The data tape library platform may include software and hardware providing functionality to display to a user via a graphical user interface (GUI) information about data tape cartridges, data tapes, media drives, read/write/erasure operations, and recommendations for actions associated with the data tapes and media drives. The data tape library may generate a default recommendation based on software and hardware associated with the data tape library. The data tape library platform may generate the alternative recommendation that differs from the default recommendation based on the metadata generated by the data tape library as well as based on additional data measured and/or generated by the data tape library platform.

For example, the data tape library may detect an error indicating that a read operation required rewinding and re-reading a particular portion of the data tape multiple times to complete the read operation. Based on the detected error, the data tape library may generate a default recommendation to clean or inspect a media drive. However, the system may determine, based on a high calibration value associated with the media drive, that the media drive has been found in good condition. Based on the calibration state of the media drive, the system may determine that the default recommendation to clean or inspect the media drive is not likely to address the detected error. Accordingly, based on the calibration state of the media drive, the system may generate an alternative recommendation to clean or inspect a data tape associated with the performed operation.

According to another example embodiment, the system may generate a confidence score associated with a default recommendation. The system may generate a high confidence score when a default recommendation corresponds to both (a) a detected error, and (b) a calibration state of a media drive. The system may generate a low confidence score when a default recommendation has an inverse correspondence with one or both of (a) a detected error, and (b) a calibration state of a media drive.

For example, the system may transmit a default recommendation, generated by a data tape library, to inspect a media drive to a data tape library platform to display on a graphical user interface (GUI). Based on a good calibration status of the media drive, the system may determine that inspecting the media drive is not likely to address the detected error. Accordingly, the system may generate a low confidence score associated with the default recommendation. The system may cause the GUI of the data tape library platform to display the confidence score together with the default recommendation. Alternatively, or in addition, the system may generate a warning or alert that the identified error status may not be accurate. Alternatively, or in addition, the system may present to a user both the default recommendation generated by the data tape library and the alternative recommendation generated by the data tape library platform. The system may further present confidence scores associated with the default recommendation and the alternative recommendation.

According to one or more embodiments, a system may use a media drive for a read/write/erasure operation that the system would not recommend for a validation operation. For example, a media drive having a calibration status of "poor" may be used by a system to perform read and write operations on data tapes. The media drive may be one media drive in a pool of media drives, and the system may select the media drive based on one or more of: (a) requirements of a read/write operation, and (b) usage rates of the media drives in the pool of media drives. As an example, the system may alternate usage among the different media drives in a pool of media drives to extend the life of all the media drives in the pool of media drives. The system may identify priority levels of read/write operations to determine whether a read/write operation requires a media drive having a "good" calibration status. If the read/write operation does not require a media drive having a "good" calibration status, the system may select a media drive for performing a read/write operation based on usage rates among the media drives. If the system determines that a read/write operation requires a media drive having a "good" calibration status, the system may select a media drive having a "good" calibration status to perform the read/write operation, even if the selected media drive has a higher usage rate—such as a higher total amount of data processed, or a higher total distance of data tape read to or written from—instead of a media drive having a lower usage rate.

According to one embodiment, the system may select a particular media drive to perform an operation according to the type of operation. For example, if the operation is a read/write operation other than a data tape validation operation, the system may select a media drive having a "poor" calibration status to perform a read/write operation. For example, as discussed above, the system may select the media drive from among a set of media drives based on usage rates of the respective media drives. On the other hand, if the operation is a data tape validation operation, the system may select from among a set of media drives having a "good" calibration status, and excluding media drives having a "poor" calibration status, to perform the data tape validation operation.

While FIG. 2 describes an embodiment in which a data tape quality value is considered when generating an action recommendation only for a particular class of metadata messages from a data tape library, in one or more embodiments, the system may always consider the data tape quality value when generating recommendations. In other words, in one embodiment, the system receives one or more metadata messages based on a read, write, or validation operation and proceeds to operation 210 to obtain a data tape quality value for the data tape that is the subject of the read, write, or validation operation.

4. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 3A:
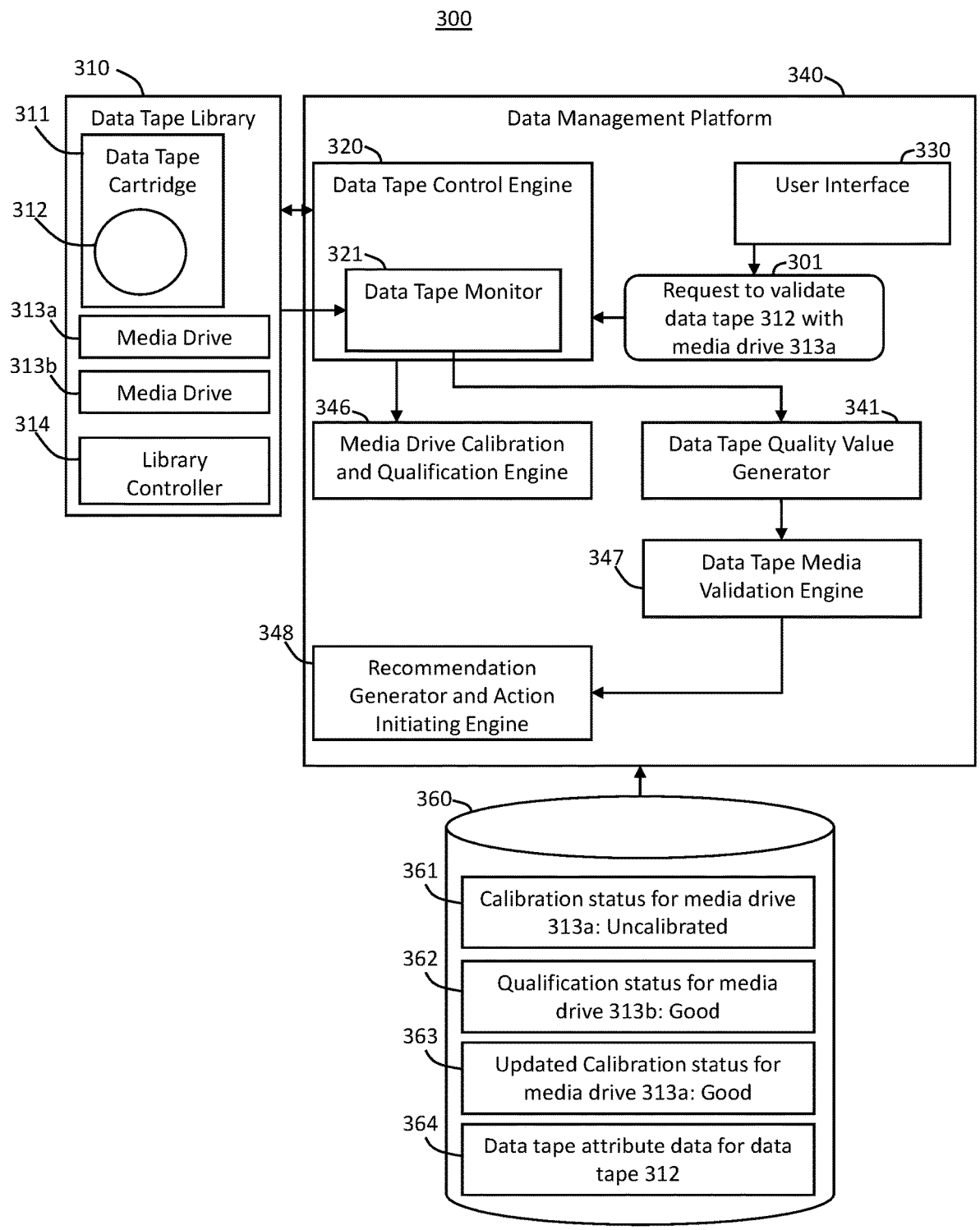
FIGS. 3A-3C illustrate an example embodiment.

FIG. 3A illustrates a system 300 that selects a media drive for performing a data tape operation (e.g., read, write, erasure, validation) and generates a recommendation for one or both of a data tape and a media drive based on data obtained from a performed operation, according to an example embodiment.

A data management platform 340 includes a user interface 330 and a data tape control engine 320. The data tape control engine 320 receives a request from a user, via the user interface 330, to perform a validation operation of a data tape 312 using a media drive 313a. The data tape control engine 320 obtains data about the data tape 312 and the media drive 313a from the data repository 360. In particular, based on determining that the requested operation is a data tape validation operation, the data tape control engine 320 obtains the calibration status 361 of the media drive 313a. While FIG. 3A illustrates the calibration status 361 for the media drive 313a in the data repository 360, embodiments include storing the calibration status 361 in a data repository maintained by the data tape library 310 or the data management platform 340.

Based on determining that the calibration status for the media drive 313a is "not-calibrated," the data management platform 340 may identify an alternative media drive 313b to perform the validation operation. The media drive calibration and qualification engine 346 may determine that a qualification status 362 of the media drive 313b is "Good." According to one or more embodiments, a calibration and qualification operations both result in a calibration/qualification status for a media drive. The calibration status may correspond to the initial operation to calibrate a media drive. The qualification status may correspond to each subsequent operation to re-calibrate the media drive.

Figure 3B:
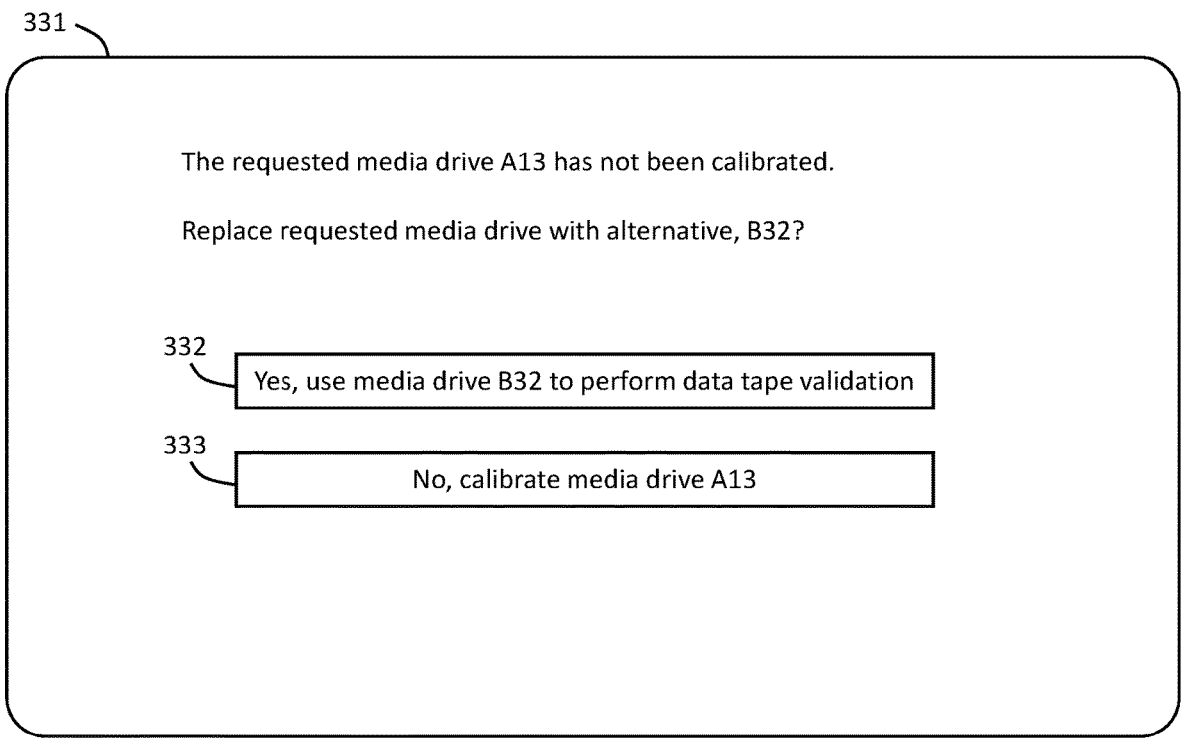

As illustrated in FIG. 3B, the data management platform 340 may present to a user via a graphical user interface 331 a message indicating that the requested media drive "A13" (i.e., media drive 313*a*) has not been calibrated. The message provides a user with an option to replace the requested media drive with an alternative media drive "B32" (i.e., media drive 313*b*). The data management platform 340 may present user-selectable interface elements 332 and 333 to allow the user to select whether to (a) use the alternative media drive to perform the data tape validation, or (b) calibrate the requested media drive, respectively.

Based on a user selection to (b) calibrate the requested media drive, the media drive calibration and qualification engine 346 selects a data tape to use when performing the media drive calibration of the media drive 313*a*. The media drive calibration and qualification engine 346 may use for a validation operation any data tape having a data tape quality value that exceeds a threshold value. According to one example, the media drive and qualification engine 346 reserves a set of one or more data tapes to use in media drive calibration operations. The reserved data tapes may be used only in validation operations and not in other types of read, write, or erasure operations. The reserved set of one or more data tapes has a known data tape quality value that exceeds a particular threshold. The reserved set of one or more data tapes may have a "gold" level data tape quality value, indicating that the data tapes are unlikely to be the cause of errors during a calibration operation.

Upon calibrating the media drive 313*a*, the media drive calibration and qualification engine 346 determines that the calibration status of the media drive 313*a* is "good." The media drive calibration and qualification engine 346 may update the calibration status 363 of the media drive 313*a* accordingly.

Prior to the data management platform 340 performing the data tape validation operation, the data tape quality value generator 341 calculates the data tape quality value for the data tape 312. The data tape quality value generator 341 calculates the data tape quality value based on data tape attribute data 364 for the data tape 312.

The data tape media validation engine 347 performs data tape validation for the data tape 312. In particular, the data tape media validation engine 347 causes the library controller 314 to perform a statistical analysis of the data tape 312 to generate a media validation value for the data tape 312. The media validation value may be based, for example, on the data tape quality value and one or more additional metrics measured during the validation operation. The statistical analysis includes measuring a frequency of one or more certain types of errors encountered during the validation operation. In the example embodiment illustrated in FIG. 3A, the library controller 314 analyzes the number of times during a read and/or write operation the media drive 313*a* was required to rewind the data tape 312 and repeat a read or write operation to successfully perform the read or write operation.

The library controller 314 generates a recommended action based on the validation operation. In the example embodiment of FIGS. 3A-3C, the library controller 314 detects a particular error during the validation process and recommends a user clean and/or inspect the media drive 313*a* to address the detected error. The detected error may correspond to detecting the media drive 313*a* having to rewind a number of times exceeding a threshold number to re-read data. The library controller 314 may determine that upon rewinding and repeating the read operation, the read operation was successfully completed. Based on the successful completion of the read operation, the library controller 314 may determine that the likely cause of the error is not a permanent flaw in the data tape 312, but rather an unclean head on the media drive 313*a* that intermittently interferes with a read operation.

The recommendation generator and action initiating engine 348 obtains the results of the data tape validation operation from the data tape media validation engine 347. The recommendation generator and action initiating engine 348 generates a recommendation for the data tape 312 and/or the media drive 313*a* based on (a) the results of the validation operation, and (b) the calibration status of the media drive 313*a*. For example, the library controller 314 may generate a recommendation, based on the validation operation, to clean and/or inspect the media drive 313*a*. However, the recommendation generator and action initiating engine 348 may determine, based on a high calibration value associated with the media drive 313*a*, that the media drive has been found in good condition. Based on the calibration state of the media drive 313*a*, the recommendation generator and action initiating engine 348 may determine that the default recommendation to clean or inspect the media drive 313*a* is not likely to address the detected error. Accordingly, based on the calibration state of the media drive 313*a* and the results of the validation operation, the recommendation generator and action initiating engine 348 may generate an alternative recommendation to clean or inspect a data tape 312.

The recommendation generator and action initiating engine 348 further generates confidence scores associated with the default recommendation from the library controller 314 and the alternative recommendation.

Figure 3C:
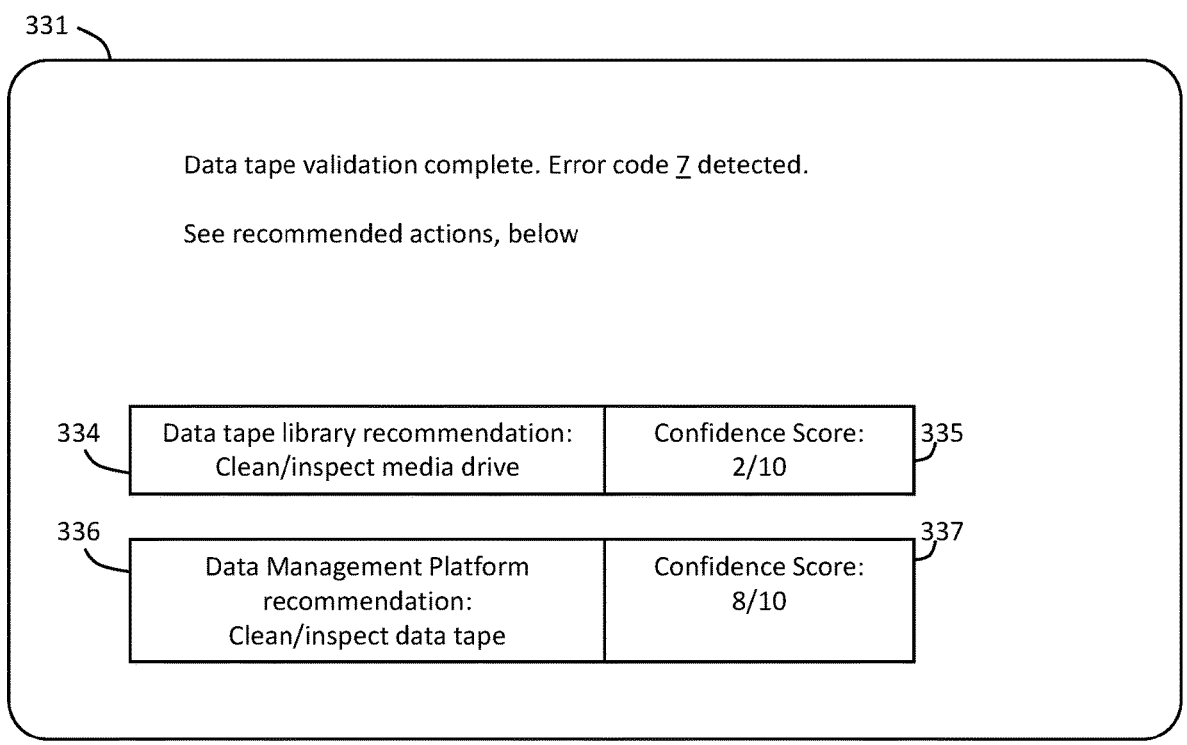

As illustrated in FIG. 3C, the data management platform 340 presents to a user via a graphical user interface 331 a message identifying an error code obtained from the library controller 314 as a result of the validation operation, recommendations 334 and 336, and confidence scores 335 and 337. The GUI 331 displays the default recommendation 334 from the library controller 314 to clean and/or inspect the media drive 313*a* together with a confidence score 335 "2/10," based on determining that since the media drive 313*a* has a good calibration status, the detected error did not likely originate from the media drive 313*a*. The GUI 331 displays the alternative recommendation 336 to clean and/or inspect the data tape 312 together with a confidence score 337 "8/10," based on determining that since the media drive 313*a* has a good calibration status, the detected error likely originated from the data tape 312.

While an embodiment is illustrated in FIGS. 3A-3C in which the data management platform 340 assigns a low confidence score to the default recommendation generated by the library controller, according to another example, the data management platform 340 may assign a higher confidence score to the default recommendation. For example, if the default recommendation is to transfer data from the data tape to a new data tape, and if the calibration status of the media drive used to perform a validation of the data tape is "good," the data management platform 340 may assign a high confidence score, such as "9/10" to the default recommendation generated by the data tape library. According to another example embodiment, the data management platform 340 may assign a confidence score near or at a middle of a range of confidence scores based on determining that the calibration state of the media drive is poor and therefore does not provide useful information to narrow down a source of errors detected during a validation operation. For example, if a calibration or qualification status of a media drive used to perform a validation operation is "poor," the system may generate a confidence score of 4/10 associated with a recommendation to check a media drive. The lower confidence score indicates that the poor calibration status makes it difficult for the data management platform to accurately pinpoint the source of detected errors.

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
    receiving a request to perform an operation including an exchange between a first media drive and a data tape;
    based on determining the operation is a validation operation to validate an operating status of the data tape:
        identifying a calibration status of the first media drive;
    based on determining that the calibration status does not satisfy a predefined threshold, performing a calibration procedure associated with the first media drive;
    based on the calibration procedure, executing the request on a calibrated media drive;

subsequent to executing the request, obtaining a data tape quality value of the data tape, the data tape quality value comprising: (a) a particular data tape error correction value representing detected errors associated with the data tape, (b) a data tape length value representing a length of the data tape traversed in data-processing operations, and (c) a scaling factor representing a rate at which a particular data tape error causes degradation of the data tape;

based on: (a) the validation operation, (b) the data tape quality value, and (c) the calibration status of the calibrated media drive, generating a first recommended action associated with the data tape; and based on the calibration status of the calibrated media drive, generating a confidence score associated with the first recommended action.

2. The non-transitory computer readable medium of claim 1, wherein the calibration procedure includes selecting the calibrated media drive from among a plurality of candidate media drives including the first media drive and the calibrated media drive.

3. The non-transitory computer readable medium of claim 1, wherein the calibration procedure includes performing a calibration of the first media drive by performing a statistical analysis of the first media drive while performing operations accessing the first media drive using a data tape having a pre-defined quality.

4. The non-transitory computer readable medium of claim 1, wherein determining that the calibration status does not satisfy the predefined threshold includes determining: (a) that a calibration operation was previously performed on the first media drive, and (b) a predetermined number of read and write operations, exceeding a threshold number, has been performed on the first media drive, wherein performing the calibration procedure includes performing a qualification operation of the first media drive to re-calibrate the first media drive.

5. The non-transitory computer readable medium of claim 1, wherein, in response to executing the request:

receiving, at a data tape library analysis layer, a metadata message from a data tape library, the metadata message including a second recommended action for the first media drive;

based on the calibration status of the calibrated media drive:

(a) generating the first recommended action for the data tape; and (b) transmitting the first recommended action to a user interface.

6. The non-transitory computer readable medium of claim 1, wherein, in response to executing the request:

receiving, at a data tape library analysis layer, a metadata message from a data tape library, the metadata message including the first recommended action for the first media drive;

based on the calibration status of the calibrated media drive:

(a) generating a confidence score associated with the first recommended action indicating a low confidence level in the first recommended action; and (b) transmitting the first recommended action and the confidence score to a user interface.

7. The non-transitory computer readable medium of claim 1, wherein the first recommended action includes at least one of:

(1) use a different media drive to perform the operation,
(2) migrate data from the data tape to another data tape,
(3) replace the data tape with another data tape having a higher quality grade,
(4) replace the data tape with another data tape compatible with the first media drive, and repeat the operation
(5) migrate data to another data tape and do not use the data tape,
(6) type of error unknown, no recommendation is possible,
(7) clean the first media drive,
(8) clean the data tape,
(9) operation failure—re-run the operation.

8. The non-transitory computer readable medium of claim 1, wherein the instructions further comprise:

receiving a second request to perform a second operation including an exchange between the first media drive and the data tape; and based on determining the operation is not a validation operation to validate the operating status of the data tape: performing the second operation without determining the calibration status of the first media drive after receiving the second request and prior to performing the second operation.

9. A method, comprising:

receiving a request to perform an operation including an exchange between a first media drive and a data tape;

based on determining the operation is a validation operation to validate an operating status of the data tape: identifying a calibration status of the first media drive;

based on determining that the calibration status does not satisfy a predefined threshold, performing a calibration procedure associated with the first media drive;

based on the calibration procedure, executing the request on a calibrated media drive;

subsequent to executing the request, obtaining a data tape quality value of the data tape, the data tape quality value comprising: (a) a particular data tape error correction value representing detected errors associated with the data tape, (b) a data tape length value representing a length of the data tape traversed in data-processing operations, and (c) a scaling factor representing a rate at which a particular data tape error causes degradation of the data tape;

based on: (a) the validation operation, (b) the data tape quality value, and (c) the calibration status of the calibrated media drive, generating a first recommended action associated with the data tape; and based on the calibration status of the calibrated media drive, generating a confidence score associated with the first recommended action.

10. The method of claim 9, wherein the calibration procedure includes selecting the calibrated media drive from among a plurality of candidate media drives including the first media drive and the calibrated media drive.

11. The method of claim 9, wherein the calibration procedure includes performing a calibration of the first media drive by performing a statistical analysis of the first media drive while performing operations accessing the first media drive using a data tape having a pre-defined quality.

12. The method of claim 9, wherein determining that the calibration status does not satisfy the predefined threshold includes determining: (a) that a calibration operation was previously performed on the first media drive, and (b) a predetermined number of read and write operations, exceeding a threshold number, has been performed on the first media drive, wherein performing the calibration procedure includes performing a qualification operation of the first media drive to re-calibrate the first media drive.

13. The method of claim 9, wherein, in response to executing the request:
receiving, at a data tape library analysis layer, a metadata message from a data tape library, the metadata message including a second recommended action for the first media drive;
based on the calibration status of the calibrated media drive:
(a) generating the first recommended action for the data tape; and
(b) transmitting the first recommended action to a user interface.

14. The method of claim 9, wherein, in response to executing the request:
receiving, at a data tape library analysis layer, a metadata message from a data tape library, the metadata message including the first recommended action for the first media drive;
based on the calibration status of the calibrated media drive:
(a) generating a confidence score associated with the first recommended action indicating a low confidence level in the first recommended action; and
(b) transmitting the first recommended action and the confidence score to a user interface.

15. A system, comprising:
one or more processors; and
memory storing instructions that, when executed by the one or more processors, cause the system to perform:
receiving a request to perform an operation including an exchange between a first media drive and a data tape;
based on determining the operation is a validation operation to validate an operating status of the data tape:
identifying a calibration status of the first media drive;
based on determining that the calibration status does not satisfy a predefined threshold, performing a calibration procedure associated with the first media drive;
based on the calibration procedure, executing the request on a calibrated media drive;
subsequent to executing the request, obtaining a data tape quality value of the data tape, the data tape quality value comprising: (a) a particular data tape error correction value representing detected errors associated with the data tape, (b) a data tape length value representing a length of the data tape traversed in data-processing operations, and (c) a scaling factor representing a rate at which a particular data tape error causes degradation of the data tape;
based on: (a) the validation operation, (b) the data tape quality value, and (c) the calibration status of the calibrated media drive, generating a first recommended action associated with the data tape; and
based on the calibration status of the calibrated media drive, generating a confidence score associated with the first recommended action.

16. The system of claim 15, wherein the calibration procedure includes selecting the calibrated media drive from among a plurality of candidate media drives including the first media drive and the calibrated media drive.

17. The system of claim 15, wherein the calibration procedure includes performing a calibration of the first media drive by performing a statistical analysis of the first media drive while performing operations accessing the first media drive using a data tape having a pre-defined quality.

18. The system of claim 15, wherein determining that the calibration status does not satisfy the predefined threshold includes determining: (a) that a calibration operation was previously performed on the first media drive, and (b) a predetermined number of read and write operations, exceeding a threshold number, has been performed on the first media drive,
wherein performing the calibration procedure includes performing a qualification operation of the first media drive to re-calibrate the first media drive.

19. The system of claim 15, wherein, in response to executing the request:
receiving, at a data tape library analysis layer, a metadata message from a data tape library, the metadata message including a second recommended action for the first media drive;
based on the calibration status of the calibrated media drive:
(a) generating the first recommended action for the data tape; and
(b) transmitting the first recommended action to a user interface.

20. The system of claim 15, wherein, in response to executing the request:
receiving, at a data tape library analysis layer, a metadata message from a data tape library, the metadata message including the first recommended action for the first media drive;
based on the calibration status of the calibrated media drive:
(a) generating a confidence score associated with the first recommended action indicating a low confidence level in the first recommended action; and
(b) transmitting the first recommended action and the confidence score to a user interface.

* * * * *